United States Patent
Kato et al.

(10) Patent No.: US 12,202,487 B2
(45) Date of Patent: Jan. 21, 2025

(54) DRIVING SUPPORT DEVICE, VEHICLE, DRIVING SUPPORT METHOD, AND STORAGE MEDIUM

(71) Applicant: HONDA MOTOR CO., LTD., Tokyo (JP)

(72) Inventors: Daichi Kato, Wako (JP); Akio Futatsudera, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 226 days.

(21) Appl. No.: 18/109,944

(22) Filed: Feb. 15, 2023

(65) Prior Publication Data
US 2023/0294701 A1  Sep. 21, 2023

(30) Foreign Application Priority Data
Mar. 16, 2022  (JP) .................................. 2022-041702

(51) Int. Cl.
*B60W 30/18*  (2012.01)
*B60W 50/10*  (2012.01)
*B60W 50/14*  (2020.01)

(52) U.S. Cl.
CPC ...... *B60W 30/18163* (2013.01); *B60W 50/10* (2013.01); *B60W 50/14* (2013.01); *B60W 2520/10* (2013.01); *B60W 2540/215* (2020.02); *B60W 2552/00* (2020.02); *B60W 2552/10* (2020.02); *B60W 2556/40* (2020.02)

(58) Field of Classification Search
CPC ........... B60W 30/18163; B60W 50/10; B60W 50/14; B60W 2520/10; B60W 2540/215; B60W 2552/00; B60W 2552/10; B60W 2556/40; B60W 2540/229; B60W 2552/05; B60W 2556/50; B60W 2050/146; B60W 2540/26
See application file for complete search history.

(56) References Cited

U.S. PATENT DOCUMENTS

| | | | |
|---|---|---|---|
| 9,191,634 B2 * | 11/2015 | Schofield | H04N 23/54 |
| 11,396,297 B2 | 7/2022 | Kanoh | |
| 2017/0313311 A1 * | 11/2017 | Niino | B60W 40/04 |
| 2018/0345963 A1 * | 12/2018 | Maura | B60W 60/0011 |
| 2020/0398849 A1 | 12/2020 | Kanoh | |

FOREIGN PATENT DOCUMENTS

JP  6972294 B2  11/2021

* cited by examiner

*Primary Examiner* — Behrang Badii
(74) *Attorney, Agent, or Firm* — Thomas | Horstemeyer, LLP (57) ABSTRACT

The present invention provides a driving support device that performs driving support of a vehicle, comprising: a speed detector configured to detect a speed of the vehicle; and a controller configured to control lane change support from a traveling lane in which the vehicle travels to an adjacent lane, in a case where the speed of the vehicle detected by the speed detector is equal to or greater than a threshold, wherein the controller is configured to execute the lane change support even when the speed of the vehicle detected by the speed detector is lower than the threshold, in a case where a predetermined condition is satisfied, and the predetermined condition includes a condition that the lane change support is executed in a start area of a new lane adjacent to the traveling lane that increases the number of lanes.

18 Claims, 10 Drawing Sheets

|  | MANUAL DRIVING MODE | NORMAL SUPPORT MODE | EXTENSION SUPPORT MODE |
|---|---|---|---|
| ACC | × | ○ | ○ (with map) |
| ACC + LKAS | × | ○ | ○ (with map) |
| ALC | × | × | ○ (with map) |
| ALCA | × | × | ○ (with map) |

DRIVING SUPPORT DEVICE, VEHICLE, DRIVING SUPPORT METHOD, AND STORAGE MEDIUM

CROSS-REFERENCE TO RELATED APPLICATION(S)

This application claims priority to and the benefit of Japanese Patent Application No. 2022-041702 filed on Mar. 16, 2022, the entire disclosure of which is incorporated herein by reference.

BACKGROUND OF THE INVENTION

Field of the Invention

The present invention relates to a technique of controlling a vehicle.

Description of the Related Art

Japanese Patent No. 6972294 discloses a vehicle control system that performs lane change control for causing a self-vehicle to change lanes from its own lane to an adjacent lane based on a surrounding situation of the self-vehicle recognized by a recognition unit.

Even when the recognition unit does not recognize a following vehicle traveling in the adjacent lane, there are situations where a lane change control should not be executed depending on a speed difference between the following vehicle and the self-vehicle. Therefore, in the vehicle control system described in Japanese Patent No. 6972294, whether to suppress (restrict) the lane change control is determined according to whether a speed of the self-vehicle is less than or equal to a predetermined speed.

Meanwhile, the number of lanes may increase on the road on which the self-vehicle travels. In an area where the number of lanes increases (start area), it is usually very unlikely that a following vehicle will travel in the new lane. Therefore, in the area where the number of lanes increases, it may be desirable to execute lane change support (lane change control) even when the speed of the self-vehicle is equal to or lower than a predetermined speed, and there is room for improving convenience of the lane change support.

SUMMARY OF THE INVENTION

The present invention provides, for example, a technique capable of improving convenience of lane change support.

According to one aspect of the present invention, there is provided a driving support device that performs driving support of a vehicle, the driving support device comprising: a speed detector configured to detect a speed of the vehicle; and a controller configured to control lane change support from a traveling lane in which the vehicle travels to an adjacent lane, in a case where the speed of the vehicle detected by the speed detector is equal to or greater than a threshold, wherein the controller is configured to execute the lane change support even when the speed of the vehicle detected by the speed detector is lower than the threshold, in a case where a predetermined condition is satisfied, and wherein the predetermined condition includes a condition that the lane change support is executed in a start area of a new lane adjacent to the traveling lane that increases the number of lanes.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
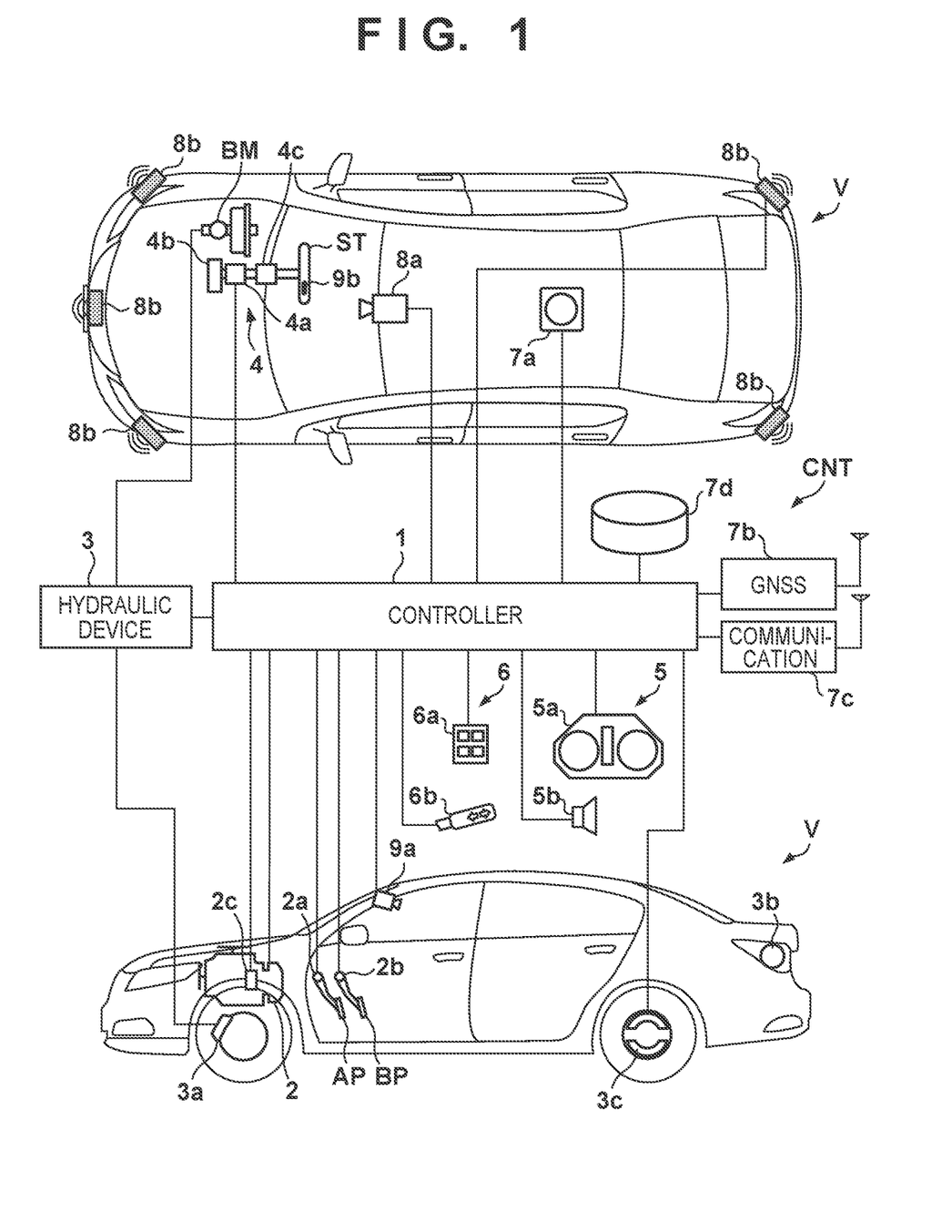
FIG. 1 is a block diagram of a vehicle and a control device thereof.

An embodiment according to the present invention will be described. FIG. 1 is a block diagram of a vehicle V and a control device CNT thereof according to the present embodiment. In FIG. 1, an outline of a vehicle V is illustrated by a plan view and a side view. The vehicle V of the present embodiment is, for example, a sedan-type four-wheel passenger vehicle, and may be, for example, a parallel hybrid vehicle. Note that the vehicle V is not limited to the four-wheeled passenger vehicle, and may be a straddle type vehicle (motorcycle or three-wheeled vehicle) or a large vehicle such as a truck or a bus.

[Configuration of Vehicle Control Device]

The control device CNT includes a controller 1 that is an electronic circuit that executes control of the vehicle V including driving support of the vehicle V. The controller 1 includes a plurality of electronic control units (ECUs). The ECU is provided for each function of the control device CNT, for example. Each ECU includes a processor represented by a central processing unit (CPU), a storage device such as a semiconductor memory, an interface with an external device, and the like. The storage device stores a program executed by the processor, data used for processing by the processor, and the like. The interface includes an input/output interface and a communication interface. Each ECU may include a plurality of processors, a plurality of storage devices, and a plurality of interfaces.

The controller 1 controls driving (acceleration) of the vehicle V by controlling a power unit (power plant) 2. The power unit 2 is a travel driving unit that outputs driving force for rotating driving wheels of the vehicle V, and can include an internal combustion engine, a motor, and an automatic transmission. The motor can be used as a drive source for accelerating the vehicle V, and can also be used as a generator at the time of deceleration or the like (regenerative braking).

In the case of the present embodiment, the controller 1 controls the output of the internal combustion engine or the motor or switches a gear ratio of the automatic transmission in accordance with a driving operation of the driver or a vehicle speed detected by an operation detection sensor 2a provided on an accelerator pedal AP or an operation detection sensor 2b provided on a brake pedal BP. Note that the automatic transmission is provided with a rotation speed sensor 2c that detects a rotation speed of an output shaft of the automatic transmission as a sensor that detects a traveling state of the vehicle V. The vehicle speed of the vehicle V can be calculated from a detection result of the rotation speed sensor 2c.

The controller 1 controls braking (deceleration) of the vehicle V by controlling a hydraulic device 3. A braking operation of the driver on the brake pedal BP is converted into hydraulic pressure in a brake master cylinder BM and transmitted to the hydraulic device 3. The hydraulic device 3 is an actuator capable of controlling the hydraulic pressure of the hydraulic oil supplied to a brake device 3a (for example, a disc brake device) provided on each of the four wheels based on the hydraulic pressure transmitted from the brake master cylinder BM.

The controller 1 can control braking of the vehicle V by performing drive control of an electromagnetic valve or the like included in the hydraulic device 3. The controller 1 can also configure an electric servo brake system by controlling the distribution of a braking force by the brake device 3a and a braking force by regenerative braking of the motor included in the power unit 2. The controller 1 may turn on a brake lamp 3b at the time of braking.

The controller 1 controls steering of the vehicle V by controlling an electric power steering device 4. The electric power steering device 4 includes a mechanism that steers a front wheel according to the driving operation (steering operation) of the driver on a steering wheel ST. The electric power steering device 4 includes a drive unit 4a including a motor that exerts a driving force (sometimes referred to as a steering assist torque) for supporting steering operation or automatically steering the front wheel, a steering angle sensor 4b, a torque sensor 4c that detects steering torque (called steering load torque and distinguished from steering assist torque) borne by the driver, and the like.

The controller 1 controls an electric parking brake device 3c provided on a rear wheel. The electric parking brake device 3c includes a mechanism for locking the rear wheel. The controller 1 can control locking and unlocking of the rear wheel by the electric parking brake device 3c.

The controller 1 controls an information output device 5 that notifies information to the inside of the vehicle. The information output device 5 includes, for example, a display device 5a that notifies the driver of information by an image and/or a voice output device 5b that notifies the driver of information by a voice. The display device 5a can be provided on, for example, an instrument panel or a steering wheel ST. The display device 5a may be a head-up display. The information output device 5 may notify an occupant of information by vibration or light.

The controller 1 receives an instruction input from the occupant (for example, driver) via an input device 6. The input device 6 is disposed at a position operable by the driver, and includes, for example, a switch group 6a for the driver to instruct vehicle V and/or a direction indicator lever 6b for operating a direction indicator (direction indicator).

The controller 1 recognizes and determines a current position and a course (attitude) of the vehicle V. In the case of the present embodiment, the vehicle V is provided with a gyro sensor 7a, a global navigation satellite system (GNSS) sensor 7b, and a communication device 7c. The gyro sensor 7a detects rotational motion (yaw rate) of the vehicle V. The GNSS sensor 7b detects the current position of the vehicle V. In addition, the communication device 7c performs wireless communication with a server that provides map information and traffic information, and acquires these pieces of information. In the case of the present embodiment, the controller 1 determines the course of the vehicle V based on the detection results of the gyro sensor 7a and the GNSS sensor 7b, sequentially acquires highly accurate map (high-definition map) information regarding the course from the server via the communication device 7c, and stores the map information in a database 7d (storage device). Note that the vehicle V may be provided with a sensor for detecting the state of the vehicle V, such as a speed sensor for detecting the speed of the vehicle V or an acceleration sensor for detecting the acceleration of the vehicle V.

The controller 1 executes driving support of the vehicle V based on detection results of various detection units provided in the vehicle V. The vehicle V is provided with surroundings detection units 8a and 8b, which are external sensors that detect the outside (surrounding situation) of the vehicle V, and in-vehicle detection units 9a and 9b, which are in-vehicle sensors that detect the situation inside the vehicle (the state of the driver). The controller 1 can grasp the surrounding situation of the vehicle V based on the detection results of the surroundings detection units 8a and 8b, and execute the driving support according to the surrounding situation. In addition, the controller 1 can determine whether the driver is fulfilling a predetermined operation obligation imposed on the driver when executing the driving support based on the detection results of the in-vehicle detection units 9a and 9b.

The surroundings detection unit 8a is an imaging device (hereinafter, may be referred to as a front camera 8a) that captures an image of the front of the vehicle V, and is attached to a vehicle interior side of a windshield at the front of a roof of the vehicle V, for example. The controller 1 can extract a contour of a target or a lane division line (such as a white line) on a road by analyzing an image captured by the front camera 8a.

The surroundings detection unit 8b is a millimeter wave radar (hereinafter, may be referred to as a radar 8b), detects a target around the vehicle V using radio waves, and detects (measures) a distance to the target and a direction (azimuth) of the target with respect to the vehicle V. In the example illustrated in FIG. 1, five radars 8b are provided, one at the center of the front portion of the vehicle V, one at each of the left and right corner portions of the front portion, and one at each of the left and right corner portions of the rear portion.

Note that the surroundings detection unit provided in the vehicle V is not limited to the above configuration, and the number of cameras and the number of radars may be changed, or a light detection and ranging (LiDAR) for detecting a target around the vehicle V may be provided.

The in-vehicle detection unit 9a is an imaging device (hereinafter, may be referred to as an in-vehicle camera 9a)

that captures an image of the inside of the vehicle, and is attached to, for example, the vehicle interior side at the front of the roof of the vehicle V. In the case of the present embodiment, the in-vehicle camera 9a is a driver monitor camera that captures an image of a driver (for example, eyes and a face of the driver). The controller 1 can determine the direction of the line of sight and the face of the driver by analyzing an image (a face image of the driver) captured by the in-vehicle camera 9a.

The in-vehicle detection unit 9b is a grip sensor (hereinafter, may be referred to as a grip sensor 9b) that detects grip of the steering wheel ST by the driver, and is provided in at least a part of the steering wheel ST, for example. As the in-vehicle detection unit, the torque sensor 4c that detects the steering torque of the driver may be used.

Examples of the driving support of the vehicle V include acceleration/deceleration support, lane keeping support, and lane change support. The acceleration/deceleration support is driving support (adaptive cruise control (ACC)) that controls acceleration/deceleration of the vehicle V within a predetermined vehicle speed while maintaining an inter-vehicle distance from a preceding vehicle by controlling the power unit 2 and the hydraulic device 3. The lane keeping support is driving support (lane keeping assist system (LKAS)) that controls the electric power steering device 4 to keep the vehicle V inside the lane. The lane change support is driving support (ALC: Auto Lane Changing, ALCA: Active Lane Change Assist) for changing a traveling lane of the vehicle V to the adjacent lane by controlling the electric power steering device 4. In addition, the driving support executed by the controller 1 may include a collision reduction brake, an ABS function, traction control, and/or attitude control of the vehicle V for supporting collision avoidance with a target (for example, a pedestrian, another vehicle, or an obstacle) on the road by controlling the hydraulic device 3.

Figure 2:
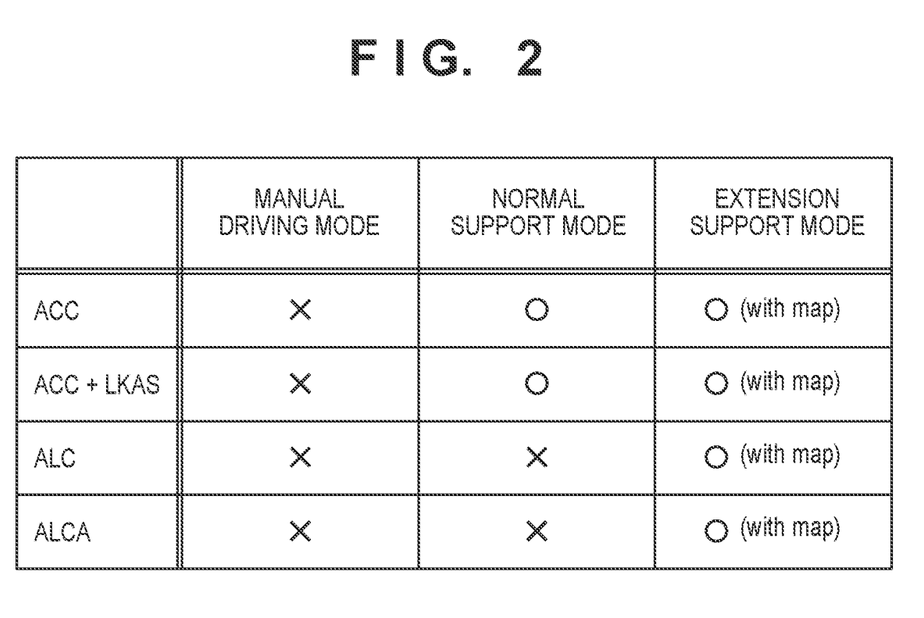
FIG. 2 is a diagram illustrating driving support executed in each mode.

The driving support (acceleration/deceleration support, lane keeping support, lane change support) of the vehicle V is executed in a plurality of driving modes including a manual driving mode, a normal support mode, and an extension support mode. FIG. 2 illustrates driving support executed in each of the manual driving mode, the normal support mode, and the extension support mode of the present embodiment. In the manual driving mode, acceleration/deceleration support, lane keeping support, and lane change support are not executed, and manual driving of the vehicle V is performed by the driver.

In the manual driving mode, when an instruction to set the acceleration/deceleration support (ACC) is input by the driver via the input device 6 (for example, the switch group 6a), the acceleration/deceleration support is started, and the mode is shifted from the manual driving mode to the normal support mode. In the normal support mode, the lane keeping support (LKAS) can be executed in addition to the acceleration/deceleration support. The lane keeping support is started when an instruction input for setting the lane keeping support is made by the driver via the input device 6 (for example, the switch group 6a) during the setting of the acceleration/deceleration support. The acceleration/deceleration support and the lane keeping support are terminated when an instruction to cancel the setting is input by the driver via the input device 6 (for example, the switch group 6a).

In the normal support mode, the driver is required to fulfill a predetermined operation obligation such as periphery monitoring and steering wheel gripping. When it is determined that the driver does not fulfill the predetermined operation obligation based on the detection result of the in-vehicle detection unit 9b, a notification for prompting the driver to fulfill the predetermined operation obligation is performed via the information output device 5.

When traveling on a specific road is started during execution of the normal support mode, highly accurate map information is acquired by the communication device 7c. Then, when matching between the highly accurate map information and the image captured by the front camera 8a is successful, the normal support mode is automatically shifted to the extension support mode. The specific road is a road that provides highly accurate map information, and examples thereof include an expressway and an automobile road. The highly accurate map information includes, in addition to normal information such as a route and a position of a specific road, information related to a detailed shape of the specific road such as presence or absence of a curve, a curvature, an increase or decrease in the number of lanes, and a gradient in the specific road. When the mode shifts from the normal support mode to the extension support mode, the information output device 5 notifies that the mode has shifted to the extension support mode, for example, by changing the light emission color of the display device 5a provided on the steering wheel ST.

In the extension support mode, the acceleration/deceleration support (and lane keeping support) in cooperation with highly accurate map information is performed. For example, based on highly accurate map information, the controller 1 can perform acceleration/deceleration support more advanced than the normal support mode, such as decelerating the vehicle V before a curve or before a point where a lane decreases, or adjusting the speed of the vehicle V according to the curvature of the curve. Similarly to the normal support mode, the extension support mode also imposes a predetermined operation obligation on the driver, such as periphery monitoring and steering wheel gripping. When it is determined that the driver does not fulfill the predetermined operation obligation based on the detection result of the in-vehicle detection unit 9b, a notification for prompting the driver to fulfill the predetermined operation obligation is performed via the information output device 5.

In addition, in the extension support mode, lane change support can be further executed. In the case of the present embodiment, the lane change support includes system-initiated lane change support (Auto Lane Changing (ALC)) that automatically changes the lane based on the determination of the controller 1, and driver-initiated lane change support (Active Lane Change Assist (ALCA)) that automatically changes the lane based on an instruction input from the driver. Note that, in both the system-initiated lane change support (ALC) and the driver-initiated lane change support (ALCA), when performing the lane change support, the driver is required to fulfill predetermined operation obligations such as periphery monitoring and steering wheel gripping.

The system-initiated lane change support (ALC) is started when an instruction input for setting the ALC in the extension support mode is performed by the driver via the input device 6 (for example, the switch group 6a). During the ALC setting, the controller 1 sequentially determines whether it is necessary to execute a lane change in order to arrive at a destination set in advance by the driver based on highly accurate map information (information such as lane increase/decrease or branching of a lane), and automatically performs the lane change when determining that it is necessary to execute the lane change. During the ALC setting, one or more lane changes can be executed according to the determination of the controller 1. The ALC ends when the vehicle arrives at the destination or when the specific road ends. The ALC may be ended in a case where an instruction input to cancel the setting is performed by the driver via the input device 6 (for example, the switch group 6a).

The driver-initiated lane change support (ALCA) is to perform one lane change in response to an instruction input by the driver, and is executed when the instruction input for instructing execution of ALCA in the extension support mode is performed by the driver via the input device 6 (for example, the direction indicator lever 6b). In the ALCA, the driver can perform an instruction input of a direction for requesting a lane change via the input device 6 (direction indicator lever 6b), and the controller 1 automatically performs a lane change to an adjacent lane in the direction in which the instruction is input by the driver. In the present embodiment, the ALCA can be executed based on highly accurate map information, but is not limited thereto, and may be executed without using highly accurate map information. The ALCA can also be executed during the setting of the system-initiated lane change support (ALC).

[Configuration of Driving Support Device]

Figure 3:
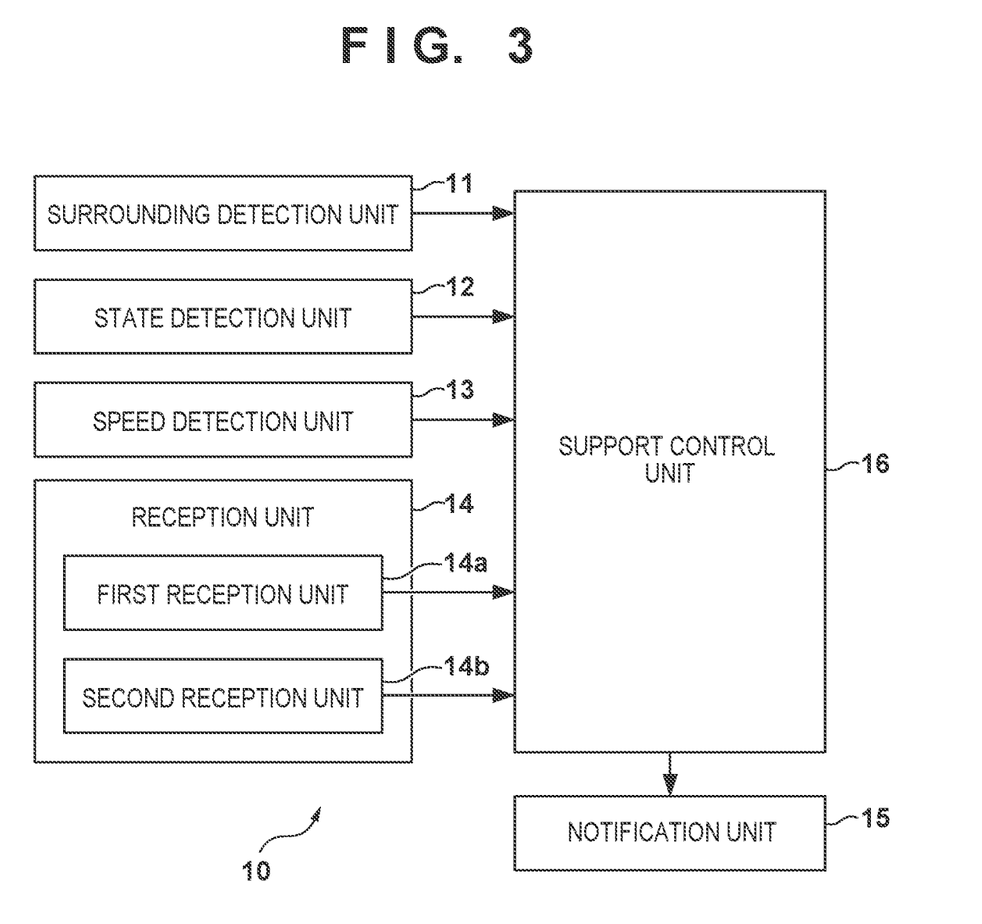
FIG. 3 is a block diagram illustrating a configuration example of a driving support device.

Hereinafter, a configuration example of the driving support device 10 of the present embodiment will be described with reference to FIG. 3. FIG. 3 is a block diagram illustrating a configuration example of the driving support device 10, and is obtained by extracting a configuration and a function particularly related to the present invention from the control device CNT described above. The driving support device 10 according to the present embodiment is a device that provides lane change support from the traveling lane in which the vehicle V is traveling the adjacent lane as driving support of the vehicle, and may include, for example, a surroundings detection unit 11 (surroundings detector), a state detection unit 12 (state detector), a speed detection unit 13 (speed detector), a reception unit 14, a notification unit 15, and a support control unit 16 (support controller). The units 11 to 16 of the driving support device 10 are communicably connected to each other via a system bus.

The surroundings detection unit 11 is the front camera 8a and radar 8b illustrated in FIG. 1, and detects the surrounding situation of the vehicle V. In the case of the present embodiment, the surroundings detection unit 11 can also detect a target (for example, an obstacle, another vehicle, or a pedestrian) around the vehicle V and measure the distance to the detected target and the position/direction of the target with respect to the vehicle V.

The state detection unit 12 is the in-vehicle camera 9a and the grip sensor 9b illustrated in FIG. 1, and detects a state of a driver of the vehicle V. In the case of the present embodiment, the state detection unit 12 can detect the line of sight and the direction of the face of the driver by photographing the driver (for example, the eyes and the face of the driver) with the in-vehicle camera 9a and analyzing the image obtained by the photographing. In addition, the state detection unit 12 can detect the grip state (that is, whether the steering wheel ST is gripped) of the steering wheel ST of the driver by the grip sensor 9b.

The speed detection unit 13 detects a speed of the vehicle V (hereinafter, sometimes referred to as a vehicle speed). In the case of the present embodiment, the speed detection unit 13 may include a speed sensor that detects the speed of the vehicle V. However, the present invention is not limited thereto, and for example, the speed of the vehicle V may be detected based on the rotation speed of the output shaft of the automatic transmission detected by the rotation speed sensor 2c illustrated in FIG. 1, or the speed of the vehicle V may be detected based on the position information of the vehicle V detected by the GNSS sensor 7b illustrated in FIG. 1.

The reception unit 14 is an input device 6 (switch group 6a, direction indicator lever 6b) illustrated in FIG. 1, and receives an instruction input from the driver. In the present embodiment, the reception unit 14 includes a first reception unit 14a and a second reception unit 14b. The first reception unit 14a is, for example, the switch group 6a provided in the steering wheel ST, and receives a first instruction input of a driver instructing to turn on (start) the support setting for providing the system-initiated lane change support (ALC). Hereinafter, the support setting turned on (started) by receiving the first instruction input may be referred to as "ALC setting". The second reception unit 14b is, for example, a direction indicator lever 6b, and receives a second instruction input from the driver instructing execution of the driver-initiated lane change support (ALCA). The second reception unit 14b (direction indicator lever 6b) can also receive an instruction input in a direction (right direction or left direction) in which the driver requests the lane change support.

The notification unit 15 is the information output device 5 (display device 5a and voice output device 5b) illustrated in FIG. 1, and notifies the driver of the state of the driving support mode, the state of driving support setting, and the like. In the case of the present embodiment, the notification unit 15 is, for example, the display device 5a provided on an instrument panel, and notifies the driver of information indicating execution of the lane change support and/or information indicating a predetermined operation obligation required for the driver to execute the lane change support as support information regarding the lane change support.

The support control unit 16 is constituted by a computer including a processor represented by a central processing unit (CPU), a storage device such as a semiconductor memory, an interface with an external device, and the like, and functions as a part of the controller 1 (ECU) illustrated in FIG. 1. The storage device stores a program (driving support program) for performing driving support of the vehicle V, and the support control unit 16 can read and execute the driving support program stored in the storage device. In the case of the present embodiment, the support control unit 16 is configured to control lane change support (ALC, ALCA) from the traveling lane in which the vehicle V is traveling to the adjacent lane based on the detection result of the surroundings detection unit 11 when the speed of the vehicle V detected by the speed detection unit 13 is equal to or greater than the first threshold.

Figure 4A:
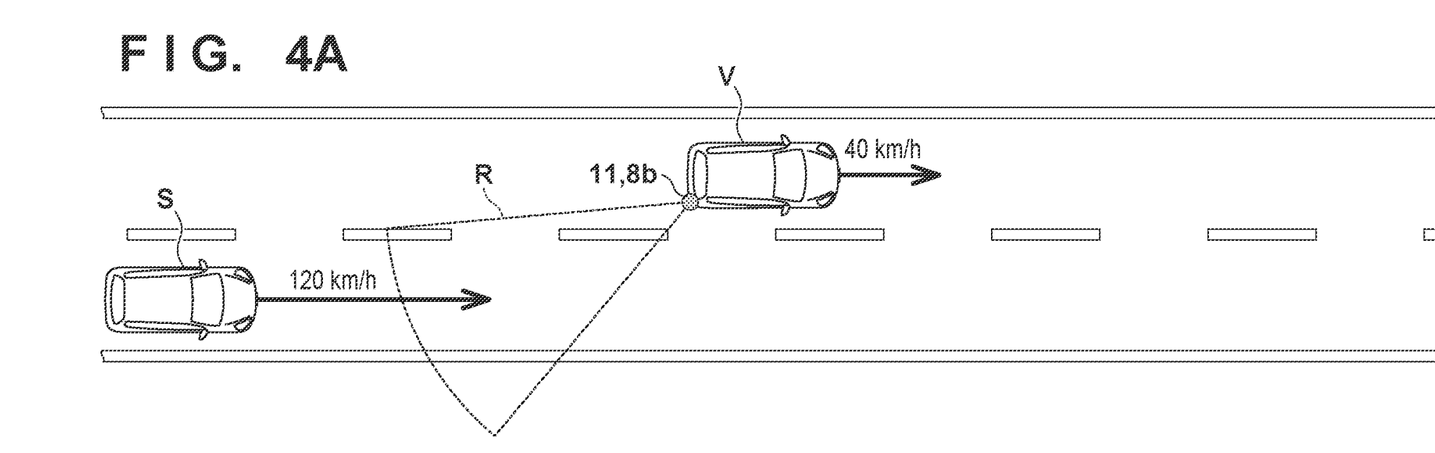
FIGS. 4A and 4B are diagrams for explaining the reason why a first threshold is set for a vehicle speed in lane change support.
Figure 4B:
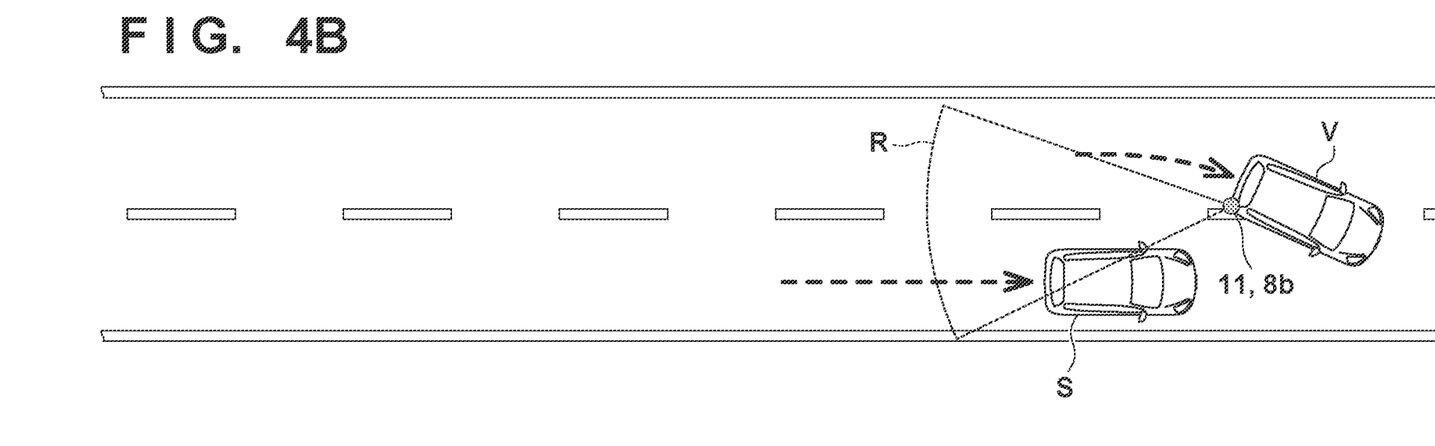

Here, even when the surroundings detection unit 11 does not detect the following vehicle traveling in the adjacent lane, there is a situation where the lane change control should not be executed depending on a speed difference between the following vehicle and the vehicle V (self-vehicle). For example, as illustrated in FIG. 4A, a situation is assumed where, when a self-vehicle V is traveling at 40 km/h and following vehicle S is traveling in the adjacent lane at 120 km/h, the lane change support to the self-vehicle V to the adjacent lane is to be executed. In the situation of FIG. 4A, since the following vehicle S does not enter the detectable range R of the surroundings detection unit 11 (radar 8b) and the following vehicle S is not detected by the surroundings detection unit 11, it is determined that the lane change support can be executed. However, when the lane change support is executed in this situation, since the speed difference between the self-vehicle V and the following vehicle S is large, an inter-vehicle distance between the self-vehicle V and the following vehicle S rapidly decreases, and the self-vehicle V and the following vehicle S may suddenly approach each other as illustrated in FIG. 4B. Therefore, the support control unit 16 of the present embodiment provides the first threshold for the speed of the vehicle V as a condition for executing the lane change support, and can execute the lane change support when the speed of the vehicle V is equal to or greater than the first threshold. The first threshold can be arbitrarily set, but can be set to a speed (for example, 60 km/h) at which the lane change support can be safely executed even at a maximum speed (for example, 130 km/h) assumed for the following vehicle S.

Figure 8A:
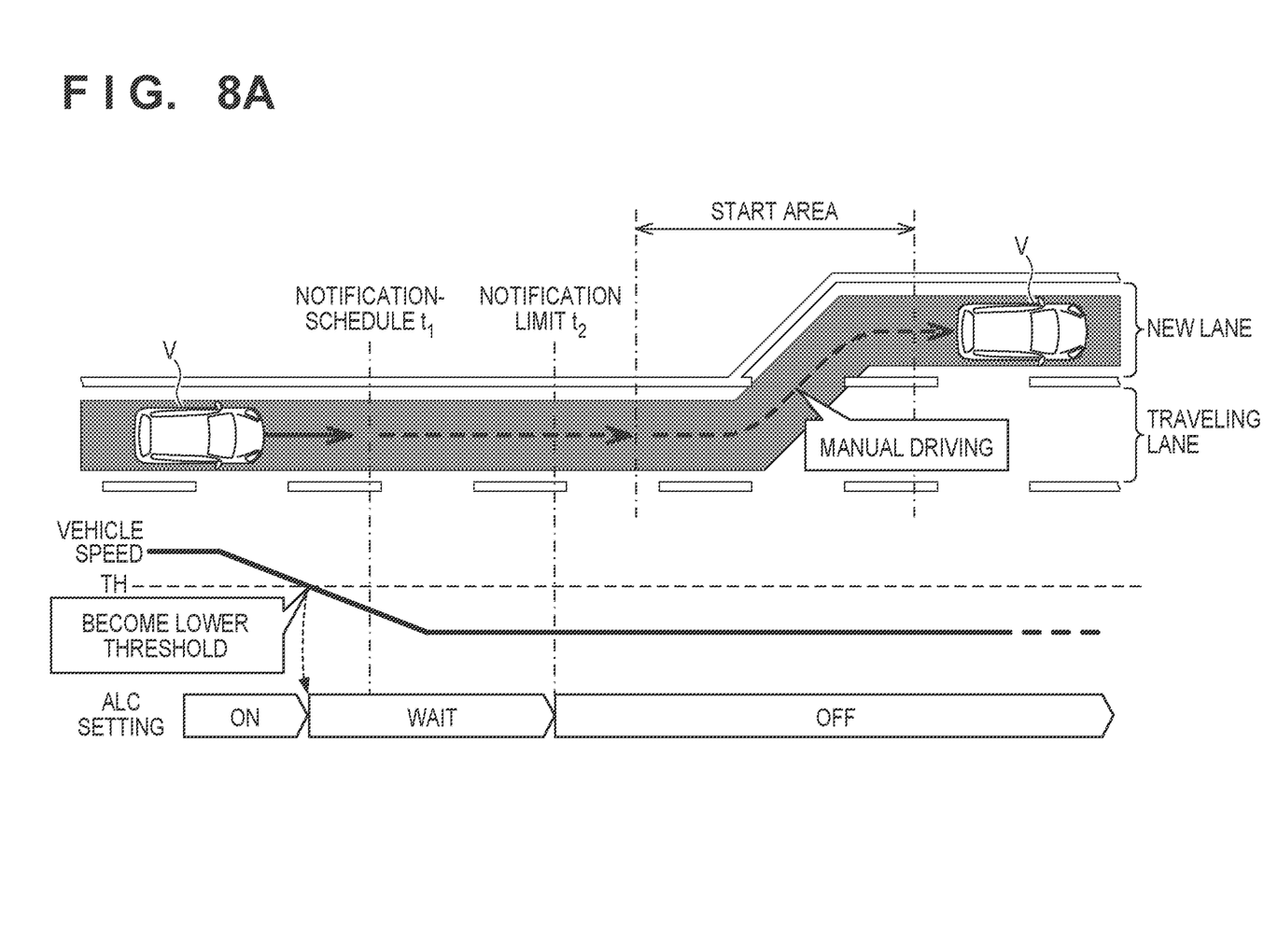
FIG. 8A is a schematic diagram illustrating a vehicle situation around an area where the number of lanes increases.
Figure 8B:
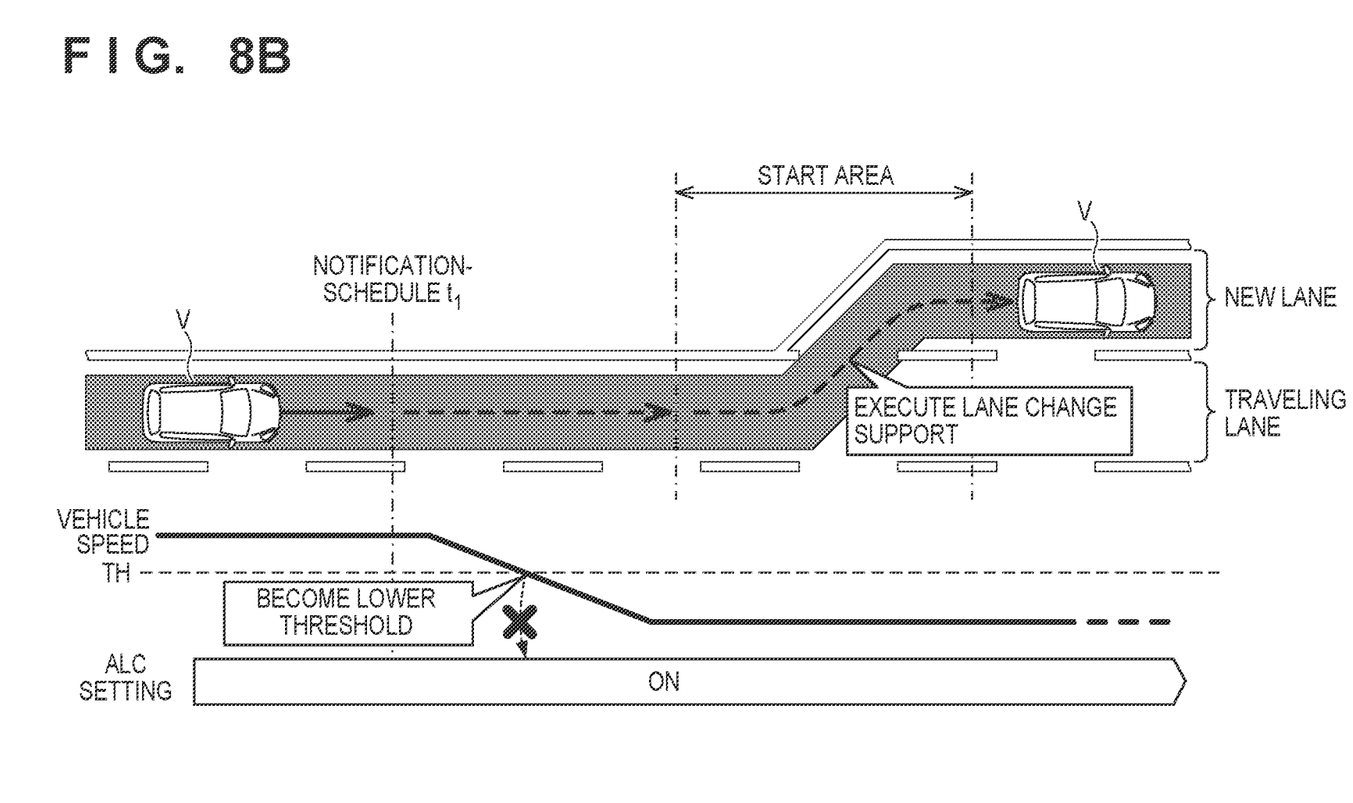
FIG. 8B is a schematic diagram illustrating a vehicle situation around the area where the number lanes increases and a block diagram of the vehicle and a control device thereof.

Meanwhile, on the road on which the vehicle V (self-vehicle) travels, the number of lanes may increase as illustrated in FIGS. 8A to 8B to be described later. In such an area where the number of lanes starts to increase, it is very unlikely that the following vehicle will travel in the increased lane. Therefore, in this area, it may be desirable to execute the lane change support even when the speed of the vehicle V is lower than the first threshold (lower than the first threshold). Therefore, even when the speed of the vehicle V detected by the speed detection unit 13 is lower than the first threshold, the support control unit 16 of the present embodiment executes the lane change support when a predetermined condition is satisfied. Hereinafter, the lane adjacent to the traveling lane of the vehicle V that newly increases the number of lanes may be referred to as a "new lane", and the area where the new lane starts may be referred to as a "start area".

[Driving Support Processing]

Figure 5A:
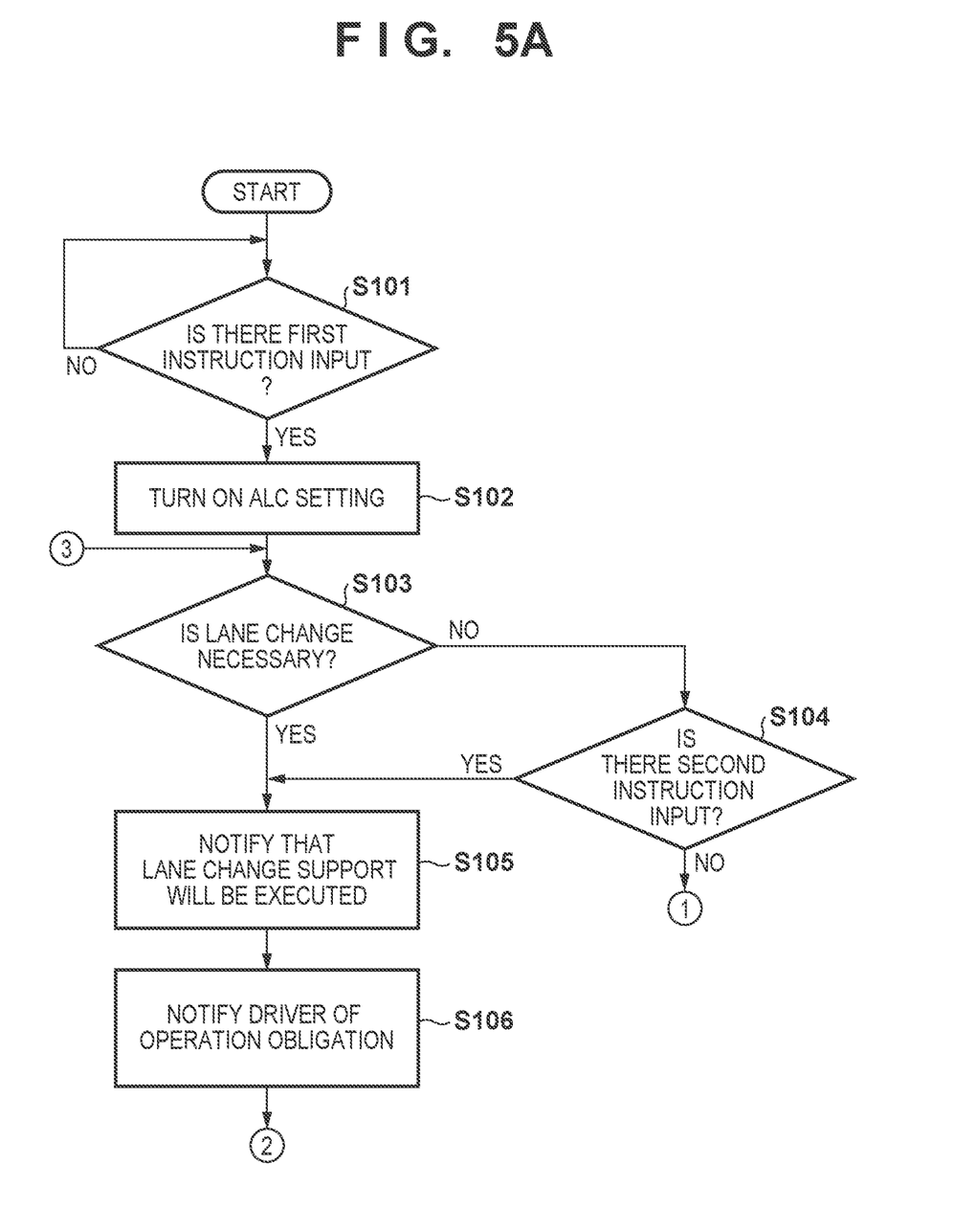
FIGS. 5A and 5B are flowcharts illustrating the driving support processing.
Figure 5B:
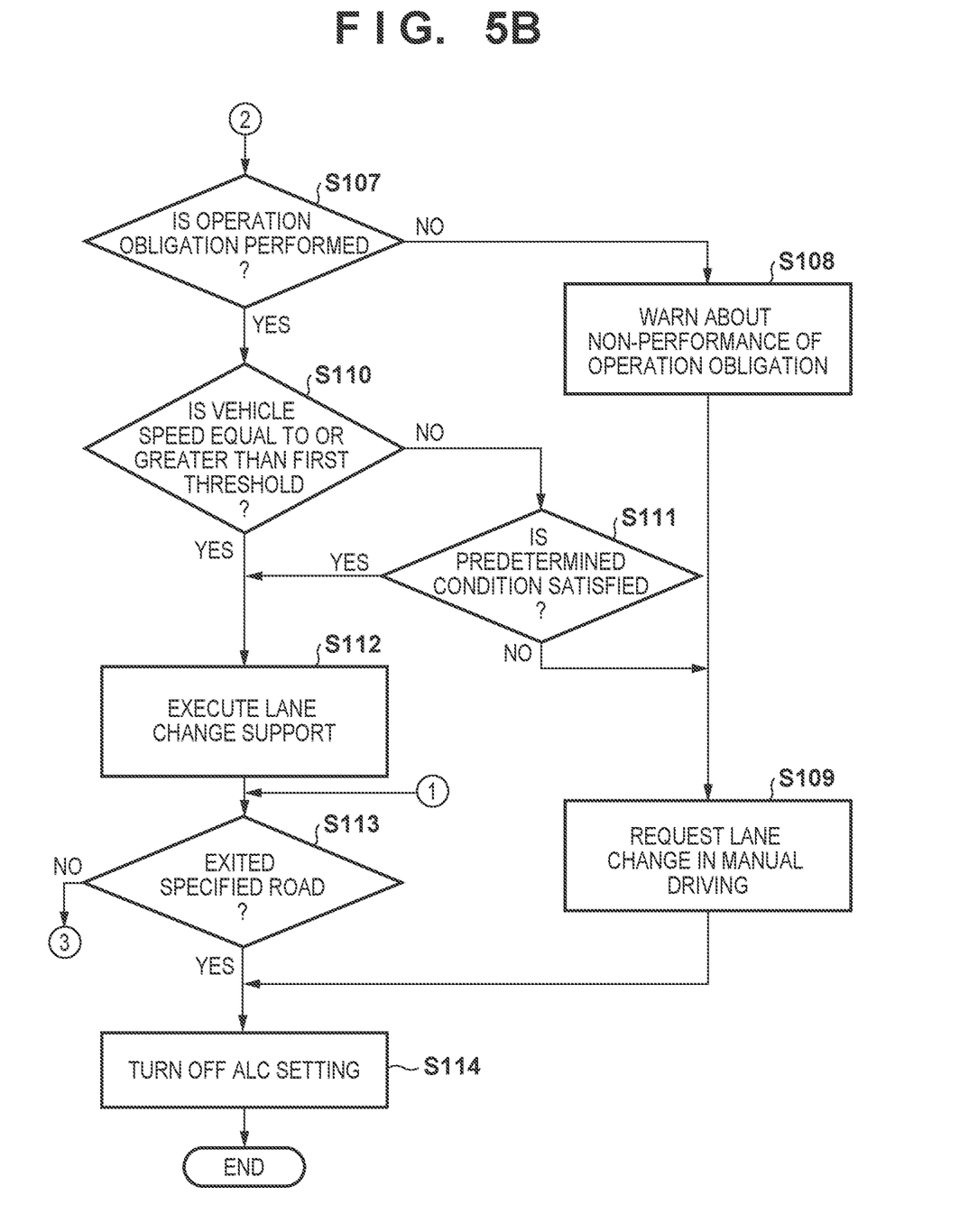

Hereinafter, driving support processing of the present embodiment will be described with reference to FIGS. 5A and 5B. FIGS. 5A and 5B is a flowchart illustrating driving support processing according to the present embodiment, and can be executed by the support control unit 16 when a driving support program is executed in the driving support device 10. The flowchart of FIGS. 5A and 5B can be started when the vehicle V starts traveling on a specific road and the driving mode shifts from the normal support mode to the extension support mode. As described above, the specific road is a road on which highly accurate map information is provided, and examples thereof include an expressway and an automobile road.

In Step S101, the support control unit 16 determines whether the first reception unit 14a (switch group 6a) has received the first instruction input from the driver. As described above, the first instruction input is an instruction input for instructing to turn on (start) the ALC setting that is the support setting provided with the system-initiated lane change support (ALC). When the first instruction input has not been received, Step S101 is repeated, and when the first instruction input has been received, the process proceeds to Step S102.

In Step S102, the support control unit 16 turns on (starts) the ALC setting. Note that the ALC setting can be turned off (ended) in response to an instruction input by the driver. For example, the support control unit 16 turns off the ALC setting when the reception unit 14 receives a driver's instruction input instructing to turn off (end) the ALC setting. In this case, the flowchart of FIGS. 5A and 5B are newly started.

In Step S103, the support control unit 16 determines whether it is necessary to execute the lane change in order to arrive at the destination set in advance by the driver based on the map information. When it is determined that it is not necessary to execute the lane change, the process proceeds to Step S104, and when it is determined that it is necessary to execute the lane change, the process proceeds to Step S105.

In Step S104, the support control unit 16 determines whether the second reception unit 14b (direction indicator lever 6b) has received the second instruction input from the driver. As described above, the second instruction input is an instruction input for instructing execution of one lane change support as the driver-initiated lane change support (ALCA), and includes an instruction input of the direction of the lane change (hereinafter, it may be referred to as an instruction direction) instructed by the driver by the operation of the direction indicator lever 6b. When the second instruction input has not been received, the process proceeds to Step S113, and when the second instruction input has been received, the process proceeds to Step S105.

Figure 6A:
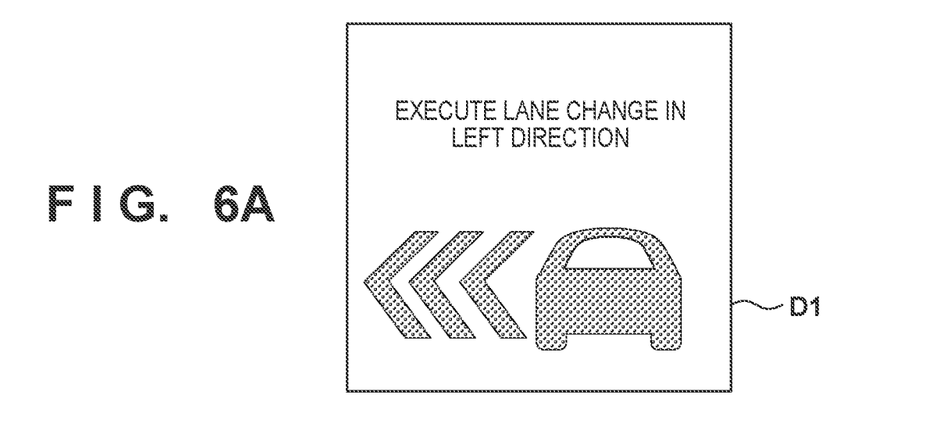
FIGS. 6A to 6C are diagrams illustrating an example of an image displayed on a display as a notification unit.

In Step S105, the support control unit 16 causes the notification unit 15 to notify the driver that lane change support (ALC or ALCA) will be executed. For example, the support control unit 16 can notify the driver of execution of the lane change support by displaying an image D1 as illustrated in FIG. 6A on a display provided on an instrument panel as the notification unit 15 (display device 5a).

Figure 6B:
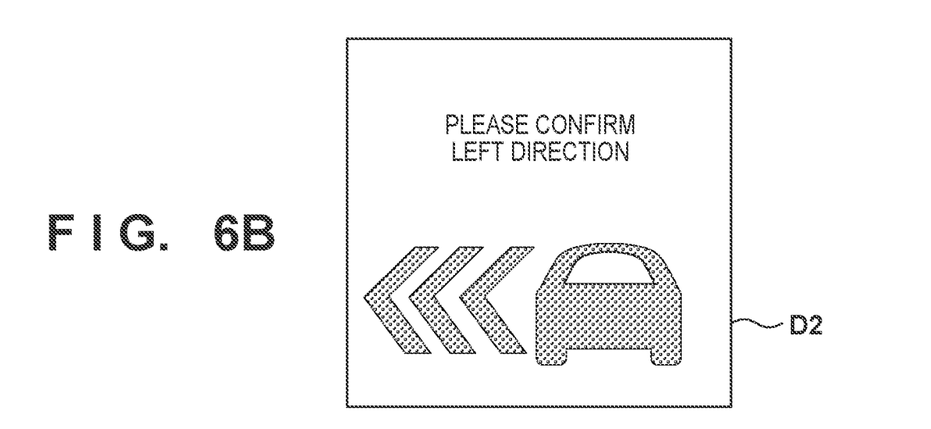
Figure 6C:
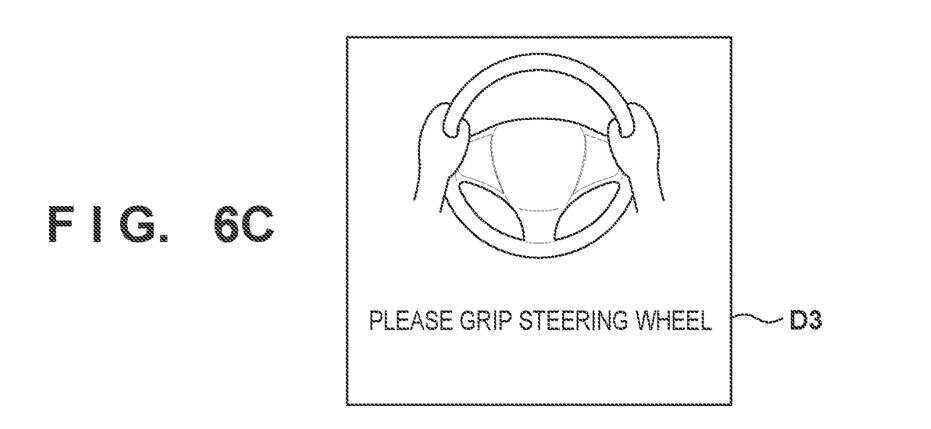

In Step S106, the support control unit 16 causes the notification unit 15 to notify the driver of the predetermined operation obligation required for the driver to execute the lane change support. In the case of the present embodiment, the predetermined operation obligation includes the periphery monitoring obligation and the steering wheel gripping obligation. The periphery monitoring obligation imposes monitoring (confirmation) of the surroundings of the vehicle V on the driver. For example, when the lane change support to the left direction (left lane) is executed, monitoring of the left direction of the vehicle V is imposed on the driver. In this case, the support control unit 16 requests monitoring (confirmation) of the left direction of the vehicle V by displaying an image D2 as illustrated in FIG. 6B on a display provided on an instrument panel as the notification unit 15 (display device 5a). The same applies to a case where the lane change support to the right direction is executed. In addition, the steering wheel gripping obligation imposes on the driver to grip the steering wheel ST. The support control unit 16 requests the driver to grip the steering wheel ST by displaying an image D3 as illustrated in FIG. 6C on a display provided on an instrument panel as the notification unit 15 (display device 5a).

In Step S107, the support control unit 16 determines whether the driver has fulfilled the operation obligation notified in Step S106 based on the detection result of the state detection unit 12. For example, the support control unit 16 can determine whether the driver has fulfilled the periphery monitoring obligation based on the image of the driver captured by the in-vehicle camera 9a as the state detection unit 12. In addition, the support control unit 16 can determine whether the driver has fulfilled the steering wheel gripping obligation based on the detection result of the grip sensor 9b as the state detection unit 12. When the driver has not fulfilled the operation obligation, the process proceeds to Step S108, and when the driver has fulfilled the operation obligation, the process proceeds to Step S110. The driver's fulfillment of the operation obligation may be understood as one of the conditions for executing the lane change support.

In Step S108, the support control unit 16 warns of unfulfillment of the operation obligation by the notification unit 15. In addition to the warning of the unfulfillment of the operation obligation or instead of the warning of the unfulfillment of the operation obligation, the support control unit 16 may notify the driver of the fulfillment of the predetermined operation obligation by the notification unit 15. When the unfulfillment of the operation obligation is warned in Step S108, the process proceeds to Step S109, and the support control unit 16 causes the notification unit 15 to make a notification requesting a lane change in manual driving. Step S109 is repeatedly performed until the driver starts manual driving. When the driver starts manual driving, the process proceeds to Step S114, and the ALC setting is turned off (ended).

In Step S110, the support control unit 16 determines whether the speed (vehicle speed) of the vehicle V detected by the speed detection unit 13 is equal to or greater than a first threshold. When the vehicle speed is not equal to or greater than the first threshold, the process proceeds to Step S111, and the support control unit 16 determines whether a predetermined condition is satisfied. Then, in a case where the predetermined condition is not satisfied, the process proceeds to Step S109, and the support control unit 16 causes the notification unit 15 to make a notification requesting a lane change in manual driving. Meanwhile, when the predetermined condition is satisfied, the process proceeds to Step S112, and the support control unit 16 executes the lane change support based on the result of detection by the surroundings detection unit 11. Note that details of the determination processing in Step S111 will be described later.

In Step S113, the support control unit 16 determines whether the vehicle V has exited the specific road. For example, the support control unit 16 can determine whether the vehicle V has exited the specific road based on the current position of the vehicle V detected by the GNSS sensor 7b. Alternatively, when the map information is no longer acquired by the communication device 7c, the support control unit 16 can determine that the vehicle V has exited the specific road. When it is determined that the vehicle V has not exited the specific road, the process returns to Step S103. Meanwhile, when it is determined that the vehicle V has exited the specific road, the process proceeds to Step S114, and the ALC setting is turned off (ended).

Figure 7:
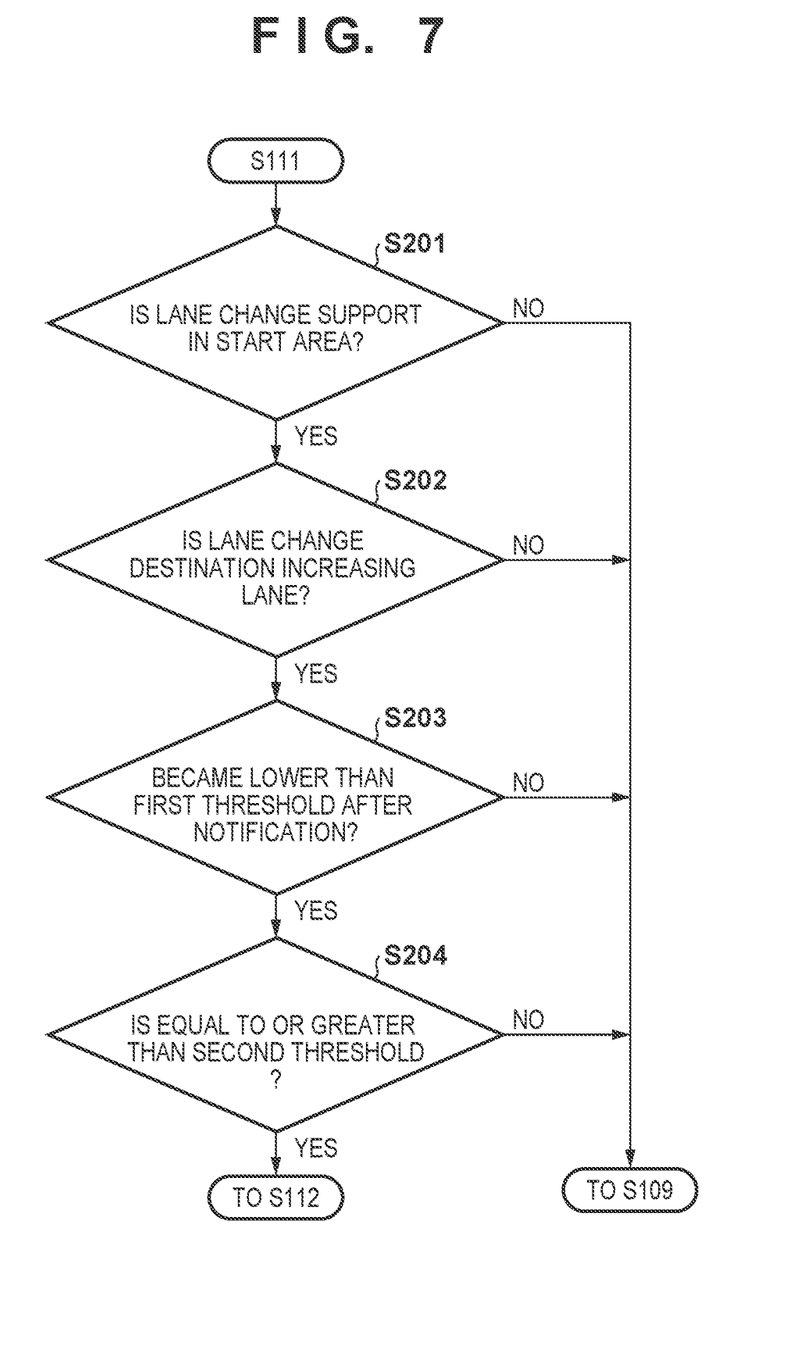
FIG. 7 is a flowchart illustrating a process of determining whether a predetermined condition is satisfied.

Next, processing (determination processing) of determining whether a predetermined condition is satisfied in Step S111 will be described with reference to FIG. 7. FIG. 7 is a follow chart illustrating the determination processing in Step S111. In the present embodiment, an example in which the process proceeds to Step S112 and the lane change support is executed in a case where all the conditions of Steps S201 to S204 are satisfied will be described, but the present invention is not limited thereto, and the lane change support may be executed in a case where at least one of the conditions of Steps S201 to S 204 is satisfied. The order of Steps S201 to S 204 is arbitrary.

In Step S201, the support control unit 16 determines whether a first condition that lane change support is to be executed in the start area of the new lane is satisfied as one of the predetermined conditions. For example, the support control unit 16 can determine whether the first condition is satisfied by determining whether the place where the lane change support is to be executed is within the start area of the new lane based on the map information of the specific road. When the first condition is satisfied, the process proceeds to Step S202, and when the first condition is not satisfied, the process proceeds to Step S109 in FIG. 5B. Here, the new lane may be, for example, an exit lane for exiting from a main line of a specific road, such as a lane for traveling to an interchange (exit) or a service area of an expressway, or a lane branched from a main line at a junction or the like.

In Step S202, the support control unit 16 determines whether a second condition that lane change support is executed with the lane change destination set to the new lane is satisfied as one of the predetermined conditions. For example, the support control unit 16 can determine whether the second condition is satisfied by determining whether the adjacent lane in which the lane change support is to be executed is the new lane based on the map information of the specific road. When the second condition is satisfied, the process proceeds to Step S203, and when the second condition is not satisfied, the process proceeds to Step S109 in FIG. 5B.

In Step S203, the support control unit 16 determines, as one of the predetermined conditions, whether a third condition that the speed (vehicle speed) of the vehicle V has become lower than the first threshold (that is, it is less than the first threshold) after notification of the support information regarding the lane change support is satisfied. In the case of the present embodiment, the support information includes "information indicating that the lane change support is executed" notified to the driver in Step S105 and "information indicating the predetermined operation obligation" notified to the driver in Step S106. However, the support information is not limited thereto, and may be only one of "information indicating that the lane change support is executed" and "information indicating a predetermined operation obligation". When the third condition is satisfied, the process proceeds to Step S204, and when the third condition is not satisfied, the process proceeds to Step S109 in FIG. 5B.

Here, details of Step S203 will be described with reference to FIGS. 8A and 8B. FIGS. 8A and 8B are schematic diagrams illustrating the situation of the vehicle V around the start area of the new lane, and also illustrate the speed (vehicle speed) of the vehicle V and an on/off state of the ALC setting.

FIG. 8A illustrates an example in which the vehicle speed is lower than the first threshold before notification of the support information. In the example of FIG. 8A, since the vehicle speed is lower than a first threshold TH at a notification-scheduled timing t1, the support control unit 16 does not notify the support information and waits until a notification limit timing t2. Then, in a case where the vehicle speed does not become the first threshold TH by the notification limit timing t2, the support control unit 16 performs "notification for requesting a lane change in manual driving" at the notification limit timing t2 (Step S109), and turns off the ALC when the driver starts the manual driving (Step S114). In this case, the driver manually changes the lane to the new lane.

Note that the notification-scheduled timing t1 is a timing at which the support information is scheduled to be notified in order to execute the lane change support in the start area of the new lane. The notification limit timing t2 is a limit notification timing at which the support information can be notified so that the driver recognizes the execution of the lane change support before the vehicle V approaches the new lane, and can be determined (calculated) based on the distance to the new lane and the vehicle speed. The notification limit timing t2 may be understood as a notification timing of a limit at which the driver can change the lane to the new lane by manual driving in response to the notification of the support information.

FIG. 8B illustrates an example in which the vehicle speed is lower than the first threshold after notification of the support information. In the example of FIG. 8B, since the vehicle speed is equal to or greater than the first threshold TH at the notification-scheduled timing t1, the support control unit 16 notifies the support information at the notification-scheduled timing t1. Although the vehicle speed is lower than the first threshold TH after the notification of the support information, in the case of the present embodiment, the lane change support to the new lane is not canceled. As described above, even when the vehicle speed is lower than the first threshold TH after the notification of the support information, the lane change support is executed, so that it is possible to avoid confusion of the driver due to cancellation of the lane change support after notification of the support information.

Returning to FIG. 7, in Step S204, the support control unit 16 determines whether a fourth condition that the speed (vehicle speed) of the vehicle V detected by the speed detection unit 13 is equal to or greater than the second threshold is satisfied as one of the predetermined conditions. That is, the support control unit 16 stops the execution of the lane change support when the speed of the vehicle V is lower than the second threshold. The second threshold may be arbitrarily set as long as it is a value lower than the first threshold, but may be set to, for example, a minimum speed at which the lane change support can be safely executed. As an example, the second threshold may be set to a speed (for example, 100 km/h) at which the lane change support can be executed safely even when the following vehicle is traveling at a legal speed (for example, 40 km/h). When the fourth condition is satisfied, the process proceeds to Step S112 in FIG. 5B, and when the fourth condition is not satisfied, the process proceeds to Step S109 in FIG. 5B.

As described above, even when the speed of vehicle V detected by speed detection unit 13 is lower than the first threshold, the driving support device 10 according to the present embodiment executes the lane change support in a case where the predetermined condition is satisfied. The predetermined condition includes the first condition that the lane change support is executed in the start area of the new lane. The predetermined condition may further include the second condition that the lane change support is executed with the lane change destination as the new lane, the third condition that the vehicle speed is lower than the first threshold after the notification of the support information, and/or the fourth condition that the vehicle speed is equal to or greater than the second threshold. As a result, the lane change support of the vehicle V in the start area of the new lane can be appropriately executed, and the convenience of the lane change support can be improved.

Other Embodiments

The driving support program described in the above embodiment is supplied to the driving support device 10 via a network or a storage medium, and a computer (for example, one or more processors constituting the support control unit 16) of the driving support device 10 can read and execute the program. The present invention can also be realized by such an aspect.

Summary of Embodiments

1. A driving support device of the above-described embodiment is a driving support device (e.g. 10) that performs driving support of a vehicle (e.g. V), the driving support device comprising:
a speed detector (e.g. 13) configured to detect a speed of the vehicle; and
a controller (e.g. 1, 16) configured to control lane change support from a traveling lane in which the vehicle travels to an adjacent lane, in a case where the speed of the vehicle detected by the speed detector is equal to or greater than a threshold,
wherein the controller is configured to execute the lane change support even when the speed of the vehicle detected by the speed detector is lower than the threshold, in a case where a predetermined condition is satisfied, and
wherein the predetermined condition includes a condition that the lane change support is executed in a start area of a new lane adjacent to the traveling lane that increases the number of lanes.

According to this configuration, the lane change support can be appropriately executed in the start area of the new lane where the possibility that the following vehicle will travel is very low, and the convenience of the lane change support can be improved.

2. In the above-described embodiment,
the predetermined condition includes a condition that the lane change support is executed with a lane change destination set to the new lane.

According to this configuration, the lane change support to the new lane can be appropriately executed in the start area of the new lane, and the convenience of the lane change support can be further improved.

3. In the above-described embodiment,
the control unit determines whether it is necessary to execute the lane change support to the new lane in order to arrive at a destination set in advance.

According to this configuration, the lane change support to the new lane can be appropriately executed in order to arrive at the destination.

4. In the above-described embodiment,
the driving support device further comprises a notification unit (e.g. 5, 15) configured to notify a driver of support information related to the lane change support, and
the predetermined condition includes a condition that the speed of the vehicle is lower than the threshold after the notification unit notifies the driver of the support information.

According to this configuration, even when the vehicle speed is lower than the threshold after the notification of the support information, the lane change support is executed, so that it is possible to avoid confusion of the driver due to cancellation of the lane change support after the notification of the support information.

5. In the above-described embodiment,
the support information includes information indicating that the lane change support is to be executed in the start area.

According to this configuration, even when the vehicle speed is lower than the threshold after the driver is notified of the execution of the lane change support in the start area of the new lane, the lane change support is executed, so that it is possible to avoid confusion of the driver due to cancellation of the lane change support after the notification of the support information.

6. In the above-described embodiment,
the support information includes information indicating an operation obligation required for the driver to execute the lane change support.

According to this configuration, even when the vehicle speed is lower than the threshold after the driver is notified of the operation obligation, the lane change support is executed, so that it is possible to avoid confusion of the driver due to cancellation of the lane change support after notification of the support information.

7. In the above-described embodiment,
the driving support device further comprises a state detector (e.g. 9a, 9b, 12) configured to detect a state of the driver, and
the predetermined condition includes a condition that the driver fulfills the operation obligation based on a result of detection by the state detector.

According to this configuration, the lane change support can be appropriately executed according to whether the driver is fulfilling the operation obligation.

8. In the above-described embodiment,
the controller is configured to stop the execution of the lane change support in a case where the speed of the vehicle detected by the speed detector is lower than a second threshold, and
the second threshold is set to a value lower than the threshold.

According to this configuration, even when the vehicle speed is lower than the threshold, the lane change support can be executed safely and appropriately.

9. In the above-described embodiment,
the controller executes the lane change support on a specific road, and
the new lane is an exit lane for exiting the specific road.

According to this configuration, the lane change support can be appropriately executed in the start area of the exit lane as the new lane, and the convenience of the lane change support can be improved.

10. In the above-described embodiment,
the specific road is a road on which map information is provided.

According to this configuration, the lane change support can be appropriately executed based on the map information.

11. In the above-described embodiment,
the controller is configured to execute the lane change support on a specific road provided with map information, and determine the start area on a basis of the map information.

According to this configuration, it is possible to appropriately execute the lane change support by determining the start area of the new lane based on the map information.

12. In the above-described embodiment,
the map information includes information on a shape of the specific road.

According to this configuration, it is possible to appropriately execute the lane change support based on the map information including the information regarding the shape of the specific road.

13. In the above-described embodiment,
the driving support device further comprises a first reception unit (e.g. 6a, 14a) configured to receive a first instruction input from a driver instructing to turn on support setting for providing the lane change support, and
the controller is configured to execute the lane change support in a case where the support setting is turned on by the first instruction input being received by the first reception unit.

According to this configuration, the system-initiated lane change support (ALC) can be appropriately executed in the start area of the new lane.

14. In the above-described embodiment,
the driving support device further comprises a second reception unit (e.g. 6b, 14b) configured to receive a second instruction input instructing execution of the lane change support, and
the controller is configured to execute the lane change support once in response to reception of the second instruction input by the second reception unit.

According to this configuration, the driver-initiated lane change support (ALCA) can be appropriately executed in the start area of the new lane.

15. In the above-described embodiment,
the driving support device further comprises a surroundings detector (e.g. 8a, 8b, 11) configured to detect a surrounding situation of the vehicle, and
the controller is configured to control the lane change support based on a detection result of the surroundings detector.

According to this configuration, the lane change support can be appropriately executed based on the detection result of the surrounding situation of the vehicle.

The invention is not limited to the foregoing embodiments, and various variations/changes are possible within the spirit of the invention.

What is claimed is:

1. A driving support device that performs driving support of a vehicle, the driving support device comprising:
a speed detector configured to detect a speed of the vehicle; and
a controller configured to control lane change support from a traveling lane in which the vehicle travels to an adjacent lane, in a case where the speed of the vehicle detected by the speed detector is equal to or greater than a threshold,
wherein the controller is configured to execute the lane change support even when the speed of the vehicle detected by the speed detector is lower than the threshold, in a case where a predetermined condition is satisfied, and
wherein the predetermined condition includes a condition that the lane change support is executed in a start area of a new lane adjacent to the traveling lane that increases the number of lanes.

2. The driving support device according to claim 1, wherein the predetermined condition includes a condition that the lane change support is executed with a lane change destination set to the new lane.

3. The driving support device according to claim 2, wherein the control unit determines whether it is necessary to execute the lane change support to the new lane in order to arrive at a destination set in advance.

4. The driving support device according to claim 1, further comprising a notification unit configured to notify a driver of support information related to the lane change support,
wherein the predetermined condition includes a condition that the speed of the vehicle is lower than the threshold after the notification unit notifies the driver of the support information.

5. The driving support device according to claim 4, wherein the support information includes information indicating that the lane change support is to be executed in the start area.

6. The driving support device according to claim 4, wherein the support information includes information indicating an operation obligation required for the driver to execute the lane change support.

7. The driving support device according to claim 6, further comprising a state detector configured to detect a state of the driver,
wherein the predetermined condition includes a condition that the driver fulfills the operation obligation based on a result of detection by the state detector.

8. The driving support device according to claim 1, wherein
the controller is configured to stop the execution of the lane change support in a case where the speed of the vehicle detected by the speed detector is lower than a second threshold, and
the second threshold is set to a value lower than the threshold.

9. The driving support device according to claim 1, wherein
the controller executes the lane change support on a specific road, and
the new lane is an exit lane for exiting the specific road.

10. The driving support device according to claim 9, wherein the specific road is a road on which map information is provided.

11. The driving support device according to claim 1, wherein the controller is configured to execute the lane change support on a specific road provided with map information, and determine the start area on a basis of the map information.

12. The driving support device according to claim 10, wherein the map information includes information on a shape of the specific road.

13. The driving support device according to claim 1, further comprising a first reception unit configured to receive a first instruction input from a driver instructing to turn on support setting for providing the lane change support,
wherein the controller is configured to execute the lane change support in a case where the support setting is turned on by the first instruction input being received by the first reception unit.

14. The driving support device according to claim 1, further comprising a second reception unit configured to receive a second instruction input instructing execution of the lane change support,
wherein the controller is configured to execute the lane change support once in response to reception of the second instruction input by the second reception unit.

15. The driving support device according to claim 1, further comprising a surroundings detector configured to detect a surrounding situation of the vehicle,
wherein the controller is configured to control the lane change support based on a detection result of the surroundings detector.

16. A vehicle comprising the driving support device according to claim 1.

17. A driving support method for performing driving support of a vehicle, the method comprising:
detecting a speed of the vehicle; and
controlling lane change support from a traveling lane in which the vehicle travels to an adjacent lane, in a case where the detected speed of the vehicle is equal to or greater than a threshold,
wherein in the controlling, in a case where a predetermined condition is satisfied, the lane change support is executed even when the detected speed of the vehicle is lower than the threshold, and
wherein the predetermined condition includes a condition that the lane change support is executed in a start area of a new lane adjacent to the traveling lane that increases the number of lanes.

18. A non-transitory computer-readable storage medium storing a program for causing a computer to execute a driving support method according to claim 17.

* * * * *